（12) United States Patent
Klets et al.

(10) Patent No.: US 8,359,323 B2
(45) Date of Patent: Jan. 22, 2013

(54) METHOD AND SYSTEM FOR PROVIDING ACCESS TO ADAPTERS

(75) Inventors: Gregory Leonidovich Klets, San Francisco, CA (US); Travis Eli Nelson, San Jose, CA (US); Madhavi Katari, Sunnyvale, CA (US); Padmaja U. Mantravadi, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 12/137,524

(22) Filed: Jun. 11, 2008

(65) Prior Publication Data

US 2009/0313644 A1   Dec. 17, 2009

(51) Int. Cl.
*G06F 7/00* (2006.01)
*G06F 17/30* (2006.01)

(52) U.S. Cl. ................. 707/758; 707/759; 707/760

(58) Field of Classification Search ............ 707/760, 707/759, 761, 763, 999.003, 999.004, 758
See application file for complete search history.

(56) References Cited

U.S. PATENT DOCUMENTS

| 5,724,570 | A | * | 3/1998 | Zeller et al. | 707/999.004 |
| 5,812,840 | A | * | 9/1998 | Shwartz | 707/999.004 |
| 6,195,662 | B1 | | 2/2001 | Ellis et al. | 707/103 |
| 2003/0093402 | A1 | | 5/2003 | Upton | 707/1 |
| 2003/0105884 | A1 | | 6/2003 | Upton | 709/318 |
| 2005/0149537 | A1 | * | 7/2005 | Balin et al. | 707/100 |
| 2006/0095413 | A1 | * | 5/2006 | Moffat et al. | 707/3 |

OTHER PUBLICATIONS

JCA Plus Adapter for MS SQL Server, http://www.netmanage.com/products/librados/pdfs/04/db_ms_sql_server.pdf, Feb. 12, 2008.

* cited by examiner

*Primary Examiner* — Vincent Boccio
(74) *Attorney, Agent, or Firm* — Janaki K. Davda; Konrad, Raynes, Davda & Victor LLP

(57) ABSTRACT

A computer program product comprises a computer useable medium. The computer useable medium has a computer readable program such that when the computer readable medium is executed on a computer, the computer is caused to receive a request from a database driver that is compatible with a software application. The request is in a database language format. Further, the computer is caused to parse the request. In addition, the computer is caused to convert the request into an intermediary data format. The computer is also caused to provide the request in the intermediary data format to a common client interface builder that reformats the request into a format that is compatible with a system resource adapter and invokes the system resource adapter with the reformatted request.

25 Claims, 11 Drawing Sheets

METHOD AND SYSTEM FOR PROVIDING ACCESS TO ADAPTERS

BACKGROUND

1. Field

This disclosure generally relates to software integration. More particularly, the disclosure relates to connectivity to Enterprise systems.

2. General Background

In a business software environment, adapters may be utilized to allow business events to flow between an Enterprise Information System ("EIS") and a client. The client may be a business or process or other software application. Most software packages have associated adapters developed for them either by the company that provides the software package or by a company that creates middleware software applications that may be utilized with the software package.

Approaches have been developed for building these adapters. For example, standards have been developed for the types of messages that can be sent and received by the adapters. In order to utilize the adapters, all of the interfaces for the standard must be implemented. For computer languages that are not based on the standard or cannot operate with the standard, the adapters, which are written in the standard, are inaccessible.

The only current remedy to allow an existing client application, which is not written in the standard, to access data in an EIS through a resource adapter or EIS Application Programming Interface ("API") is to re-code the existing client application in the standard. Such a remedy is very difficult to implement on a large scale. Further, considerable time and resources are expended.

SUMMARY

In one aspect of the disclosure, a computer program product comprises a computer useable medium. The computer useable medium has a computer readable program such that when the computer readable medium is executed on a computer, the computer is caused to receive a request from a database driver that is compatible with a software application. The request is in a database language format. Further, the computer is caused to parse the request. In addition, the computer is caused to convert the request into an intermediary data format. The computer is also caused to provide the request in the intermediary data format to a common client interface builder that reformats the request into a format that is compatible with a system resource adapter and invokes the system resource adapter with the reformatted request.

In another aspect of the disclosure, a process is provided. The process receives a request from a database driver that is compatible with a software application. The request is in a database language format. Further, the process parses the request. In addition, the process converts the request into an intermediary data format. In addition, the process provides the request in the intermediary data format to a common client interface builder that reformats the request into a format that is compatible with a system resource adapter and invokes the system resource adapter with the reformatted request.

In yet another aspect of the disclosure, a bridge component is provided. The bridge component includes a database driver that is compatible with a software application. The database driver receives a request from the software application intended for a system, the request being in a database language format. Further, the bridge component includes a database language mapper that receives the request from the database driver, parses the request, and converts the request into an intermediary data format. The bridge component also includes a common client interface builder that receives the request in the intermediary data format from the database language mapper, reformats the request into a format that is compatible with a system resource adapter, and invokes the system resource adapter with the reformatted request.

In another aspect of the disclosure, a computer program product comprises a computer useable medium. The computer useable medium has a computer readable program such that when the computer readable medium is executed on a computer, the computer is caused to receive a request from a database driver through a network server. The database driver is compatible with a software application. The request is in a database language format. Further, the computer is caused to parse the request. In addition, the computer is caused to convert the request into an intermediary data format. The computer is also caused to provide the request in the intermediary data format to a common client interface builder that reformats the request into a format that is compatible with a system resource adapter and invokes the system resource adapter with the reformatted request.

In yet another aspect of the disclosure, a process is provided. The process receives a request from a database driver through a network server. The database driver is compatible with a software application. The request is in a database language format. Further, the process parses the request. In addition, the process converts the request into an intermediary data format. The process also provides the request in the intermediary data format to a common client interface builder that reformats the request into a format that is compatible with a system resource adapter and invokes the system resource adapter with the reformatted request.

DRAWINGS

The above-mentioned features of the present disclosure will become more apparent with reference to the following description taken in conjunction with the accompanying drawings wherein like reference numerals denote like elements and in which.

Figure 5A:
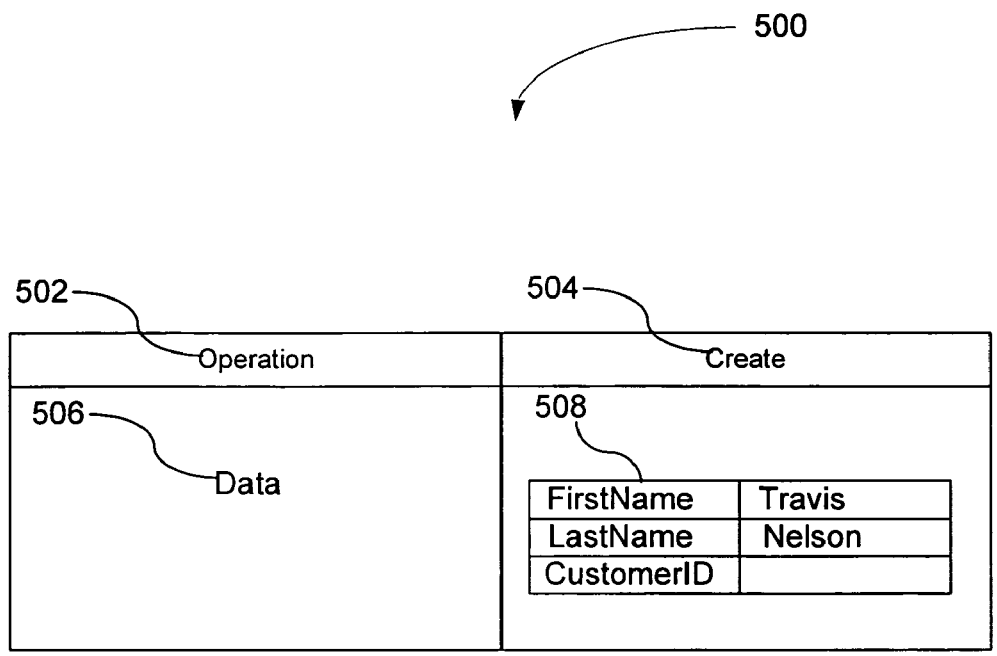
FIG. 5A illustrates a table with the insert operation for the Data Object ("DO").
Figure 5B:
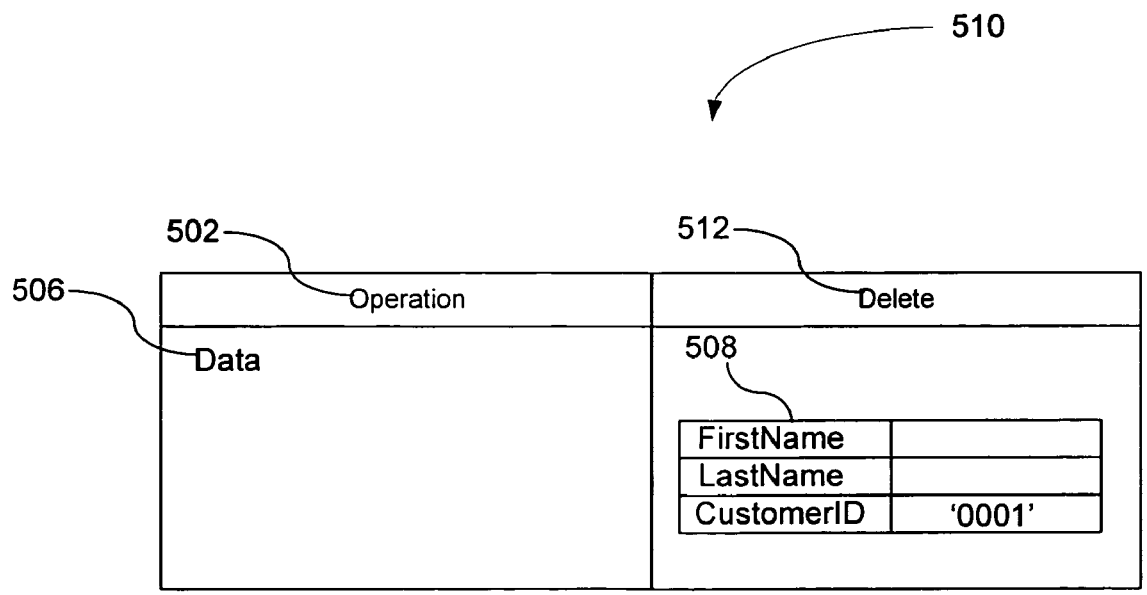
FIG. 5B illustrates a table with the delete operation for the DO.
Figure 5C:
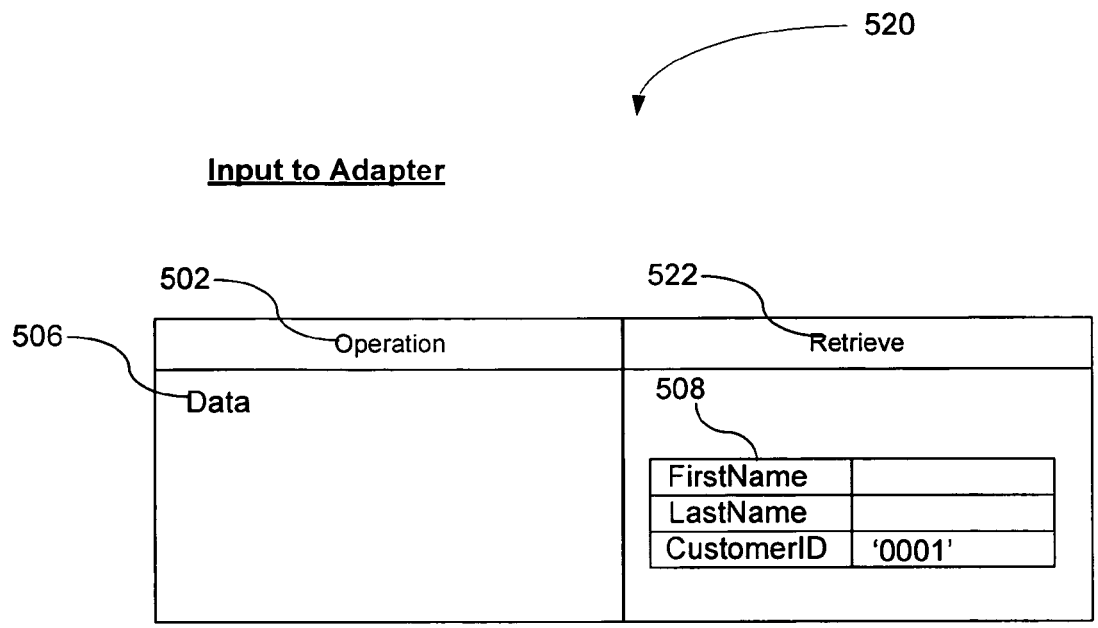
FIG. 5C illustrates a table with the retrieve operation for the DO as input to the adapter.
Figure 5D:
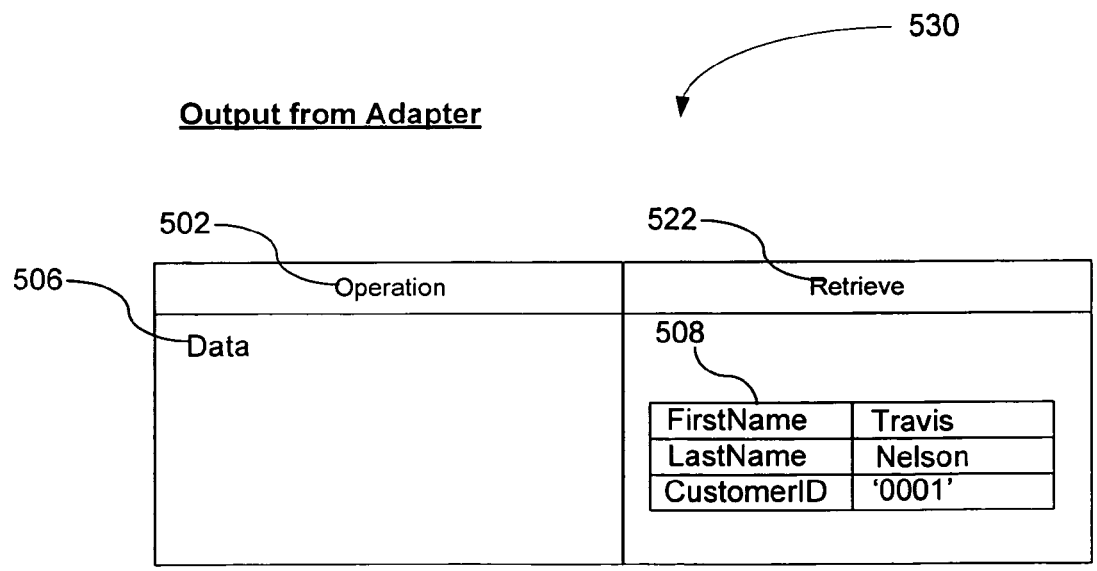

Further, FIG. 5D illustrates a table with the retrieve operation illustrated in FIG. 5C for the DO as output to the adapter.

Figure 5E:
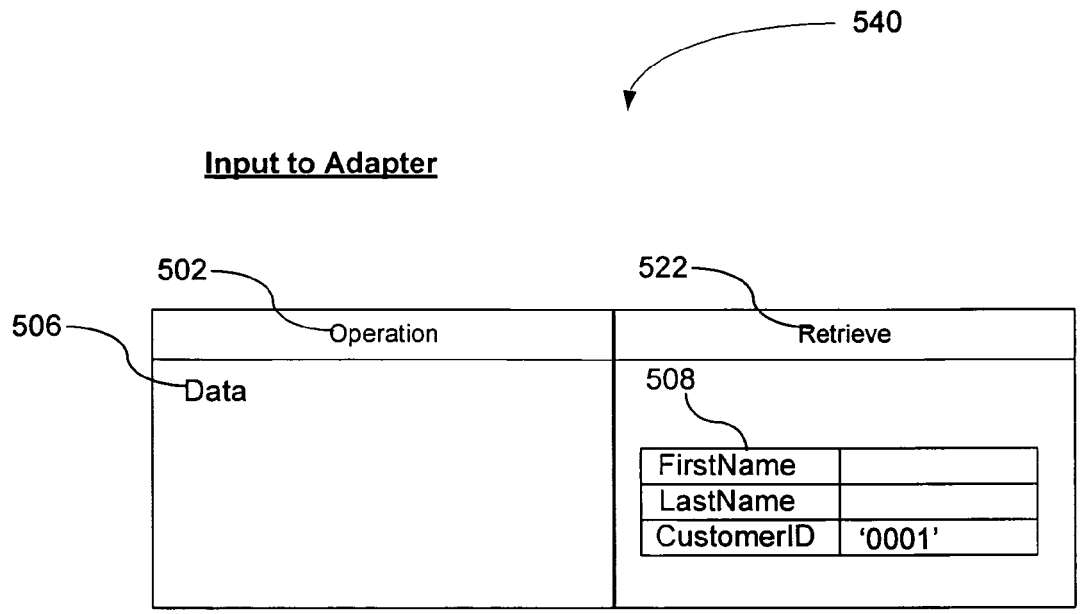

FIG. 5E illustrates another table with the retrieve operation for the DO as input to the adapter.

Figure 5F:
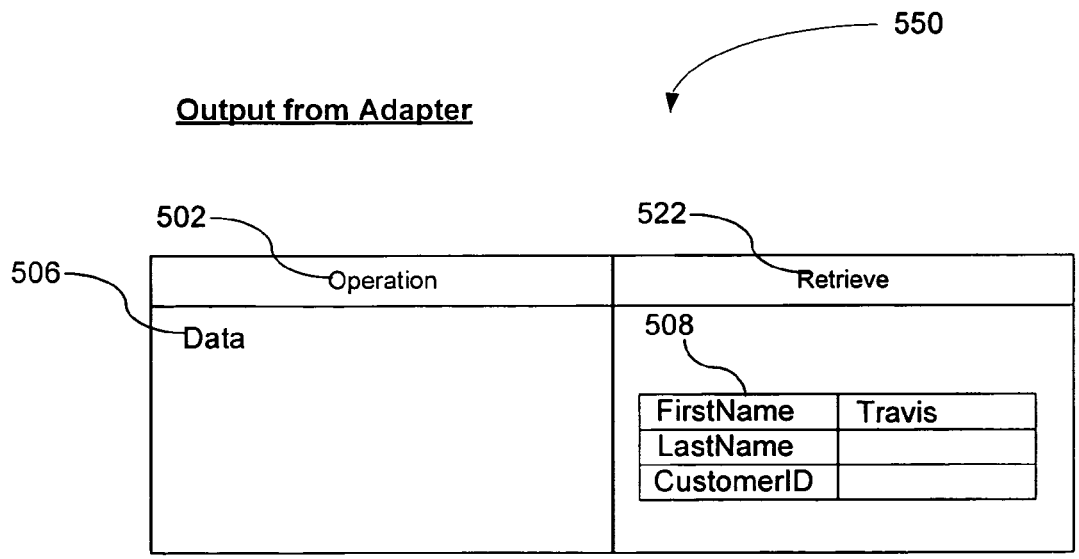

Further, FIG. 5F illustrates a table 540 with the retrieve operation illustrated in FIG. 5E for the DO as output to the adapter.

Figure 5G:
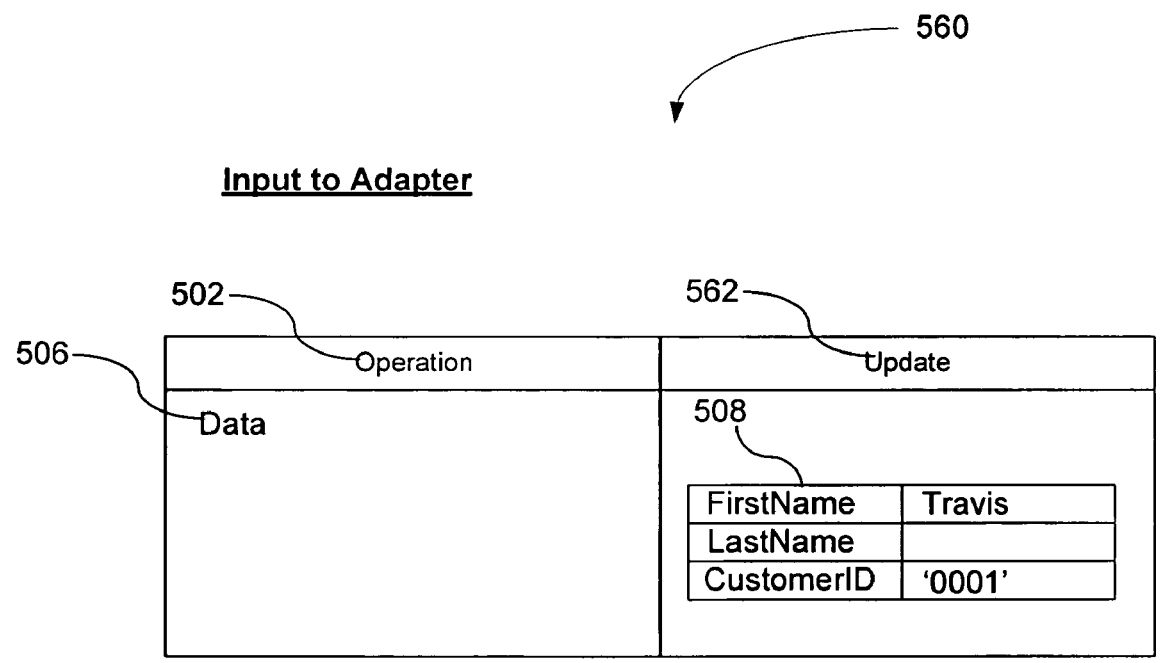

FIG. 5G illustrates a table with the update operation for the DO.

Figure 6:
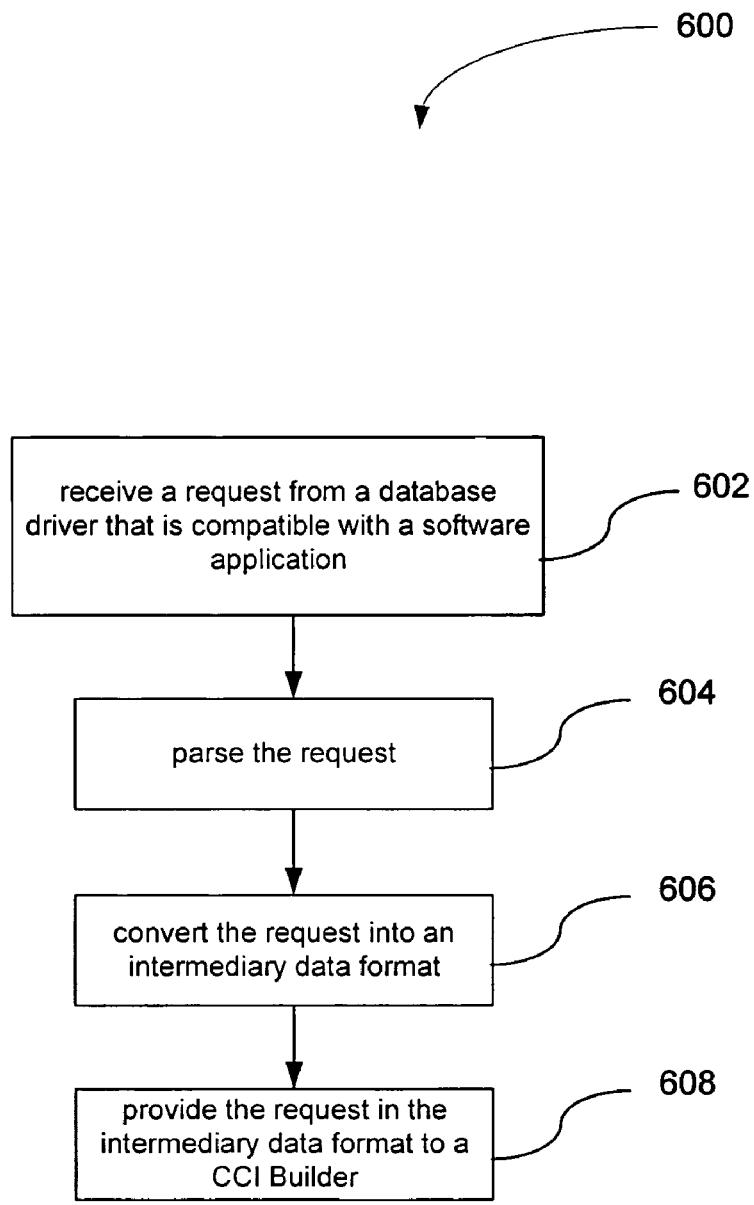

FIG. 6 illustrates a process that is utilized to provide access to an adapter.

Figure 7:
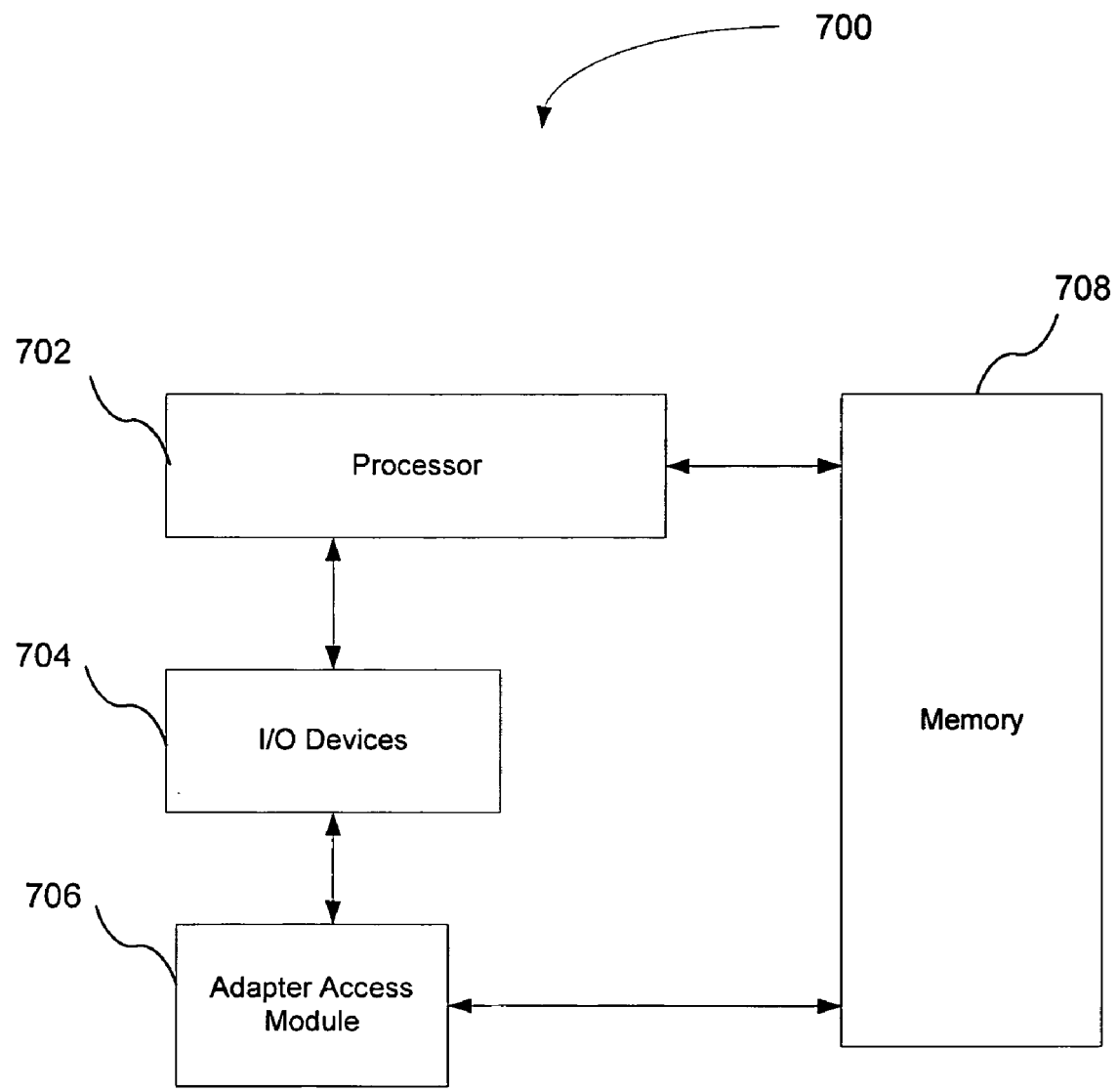

FIG. 7 illustrates a block diagram of a system that provides access to an adapter.

DETAILED DESCRIPTION

A method and system provide access to adapters for communication between an EIS and a client. Since many use cases fall into the category of accessing the EIS for data retrieval or updates, the access and use of such systems may be abstracted as a database system. The method and system will allow various systems to communicate with adapters over a database interface, e.g., Standard Query Language ("SQL") interface. As a result, easy reuse of already existing database communication infrastructure may be utilized. Further, the database communication interface may be implemented in a network mode or a local server mode. Therefore, the amount of recoding of existing client applications to allow communication through adapters is reduced.

Figure 1:
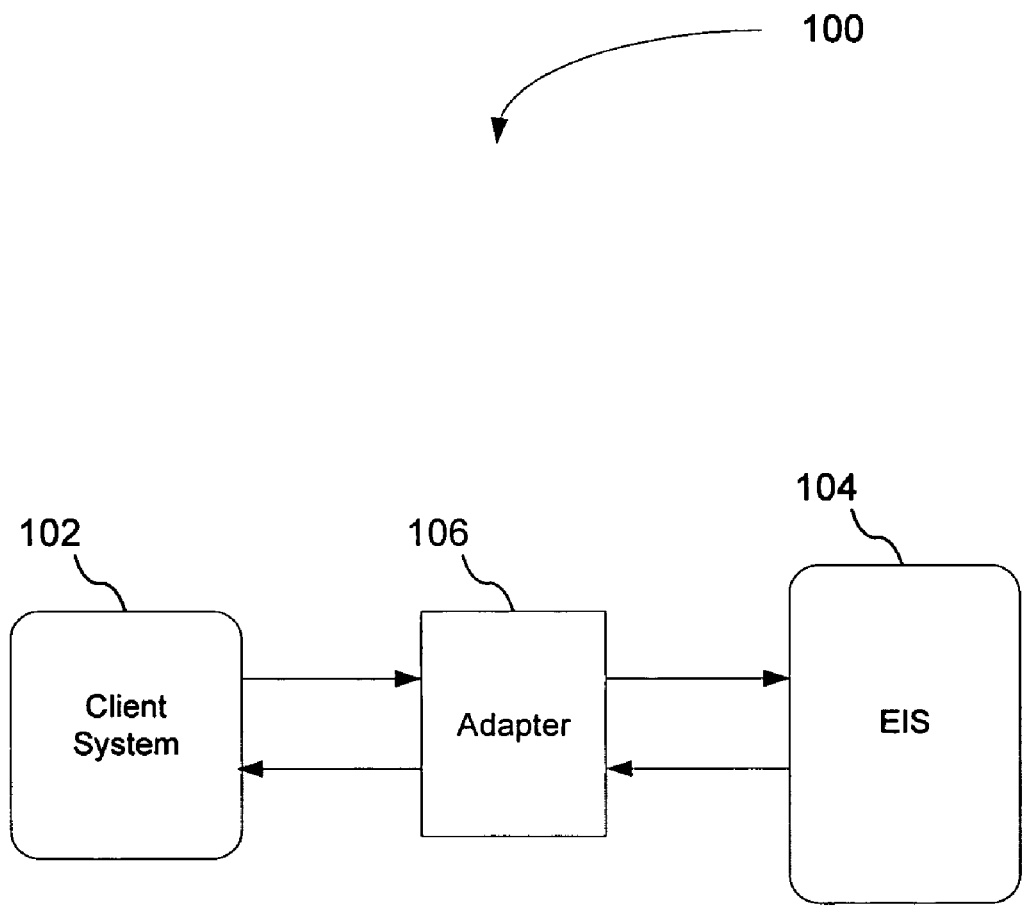
FIG. 1 illustrates an enterprise computing environment.

FIG. 1 illustrates an enterprise computing environment 100. A client system 102 attempts to communicate data back and forth with an EIS 104. Further, an adapter 106 is provided to facilitate the communication between the client system 102 and the EIS 104. The adapter 106 may be insufficient to effectuate communication between the client system 102 and the EIS 104 if the client system is utilizing a software application that is enabled to communicate to databases, but not resource adapters.

Figure 2A:
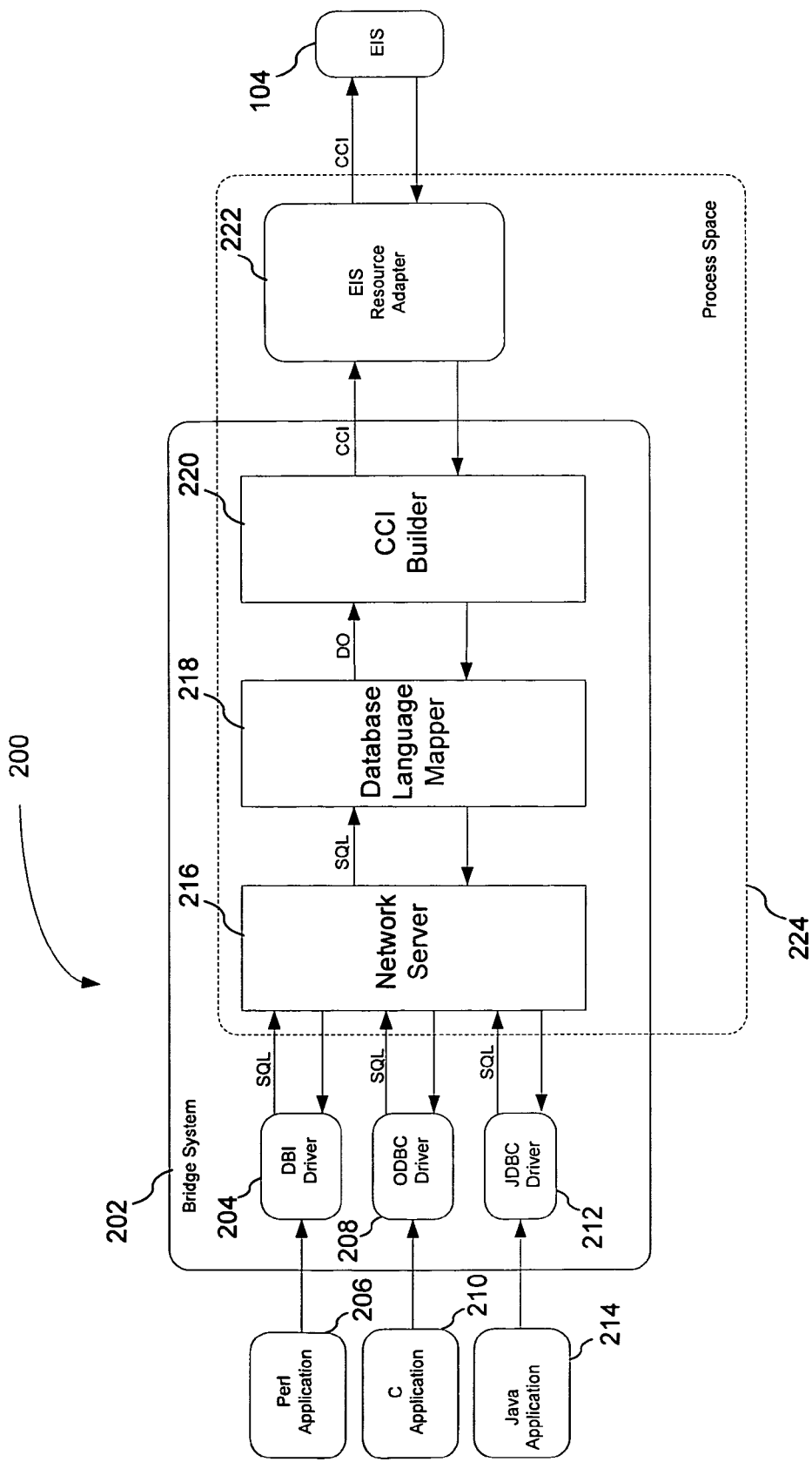
FIG. 2A illustrates a bridge network architecture that may be utilized to provide communication between the client system and the EIS, as illustrated in FIG. 1, irrespective of the computer language in which a software application is written.

FIG. 2A illustrates a bridge network architecture 200 that may be utilized to provide communication between the client system 102 and the EIS 104, as illustrated in FIG. 1, irrespective of the computer language in which a software application is written. The bridge architecture 200 includes a bridge component 202 that exposes resource adapters as database drivers that are accessible through a database language, e.g., SQL, either in a local mode or a network server mode. The bridge component 202 is responsible for accepting and parsing database language, e.g., SQL, requests into resource adapter invocations. The bridge component 202 is also responsible for receiving resource adapter native responses and converting them into result sets. Further, the bridge component 202 has a plurality of subcomponents to facilitate these functions.

One of the subcomponents of the bridge component 202 is a database driver. The database driver is an implementation of the standard for database connectivity in the client's language environment. As examples, the database driver is a Database Interface ("DBI") driver 204 for a Perl application 206, an Open DataBase Connectivity ("ODBC") driver 208 for a C application 210, and a Java™ DataBase Connectivity ("JDBC") driver 212 for a Java™ application 214. These examples are provided only for illustrative purposes as a variety of other client language environments and corresponding database drivers may be utilized. Further, a plurality of software applications and corresponding database drivers are illustrated, but the bridge component 202 may have only one database driver if there is only a single software application or multiple software applications based on the same or compatible computer languages. The database driver is responsible for marshalling the client's standard database calls into either network calls (when the network is used) or to calls on a Database Language Mapper 218, when the Bridge component 202 is utilized in-process.

Another subcomponent of the bridge component 202 is a network server 216. Optionally, the network server 216 is responsible for managing connectivity to the Bridge component 202. For example, the network server 216 accepts, schedules, and/or executes incoming requests in a network environment. This subcomponent is optional. In other words, the network server 216 is utilized if the bridge component 202 allows for either a network mode or the combination of a possible network mode or local mode. However, if the bridge component 202 only utilizes a local server mode, the network server 216 may optionally not be utilized.

The Database Language Mapper 218 is another subcomponent of the bridge component 202. The Database Language Mapper 218 is responsible for parsing and converting database language requests into an intermediary data format, e.g., Data Object, and for converting responses in the same format into result sets. An example of the Database Language Mapper 218 is an SQL Mapper. Accordingly, the SQL Mapper parses and converts SQL requests into the intermediate data format. The SQL Mapper also converts responses in the same format into result sets.

Another subcomponent of the bridge component 202 is a CCI Builder 220. The CCI Builder 220 is responsible for calling the resource adapter utilizing the CCI. Further, the CCI Builder 220 will take the output of the Database Language Mapper 218, reformat the input for an EIS Resource Adapter 222, e.g., a J2C resource adapter, and invoke the EIS Resource Adapter 222. The CCI Builder 220 then returns the appropriate result to the Database Language Mapper 218.

A client may interact with the bridge component 202 by utilizing the database driver in a similar manner to the client's interaction with a database. As a result, the amount of recoding to allow clients based on a variety of different programming languages to interact with the EIS 104 is reduced.

In one embodiment, the clients and the drivers run outside a process space 224. Further, the network server 216 runs inside the process space 224 and receives the requests from the one or more database drivers. In addition, the Database Language Mapper 218, the CCI Builder 220, and the EIS Resource Adapter 222 run inside the process space 224.

Figure 2B:
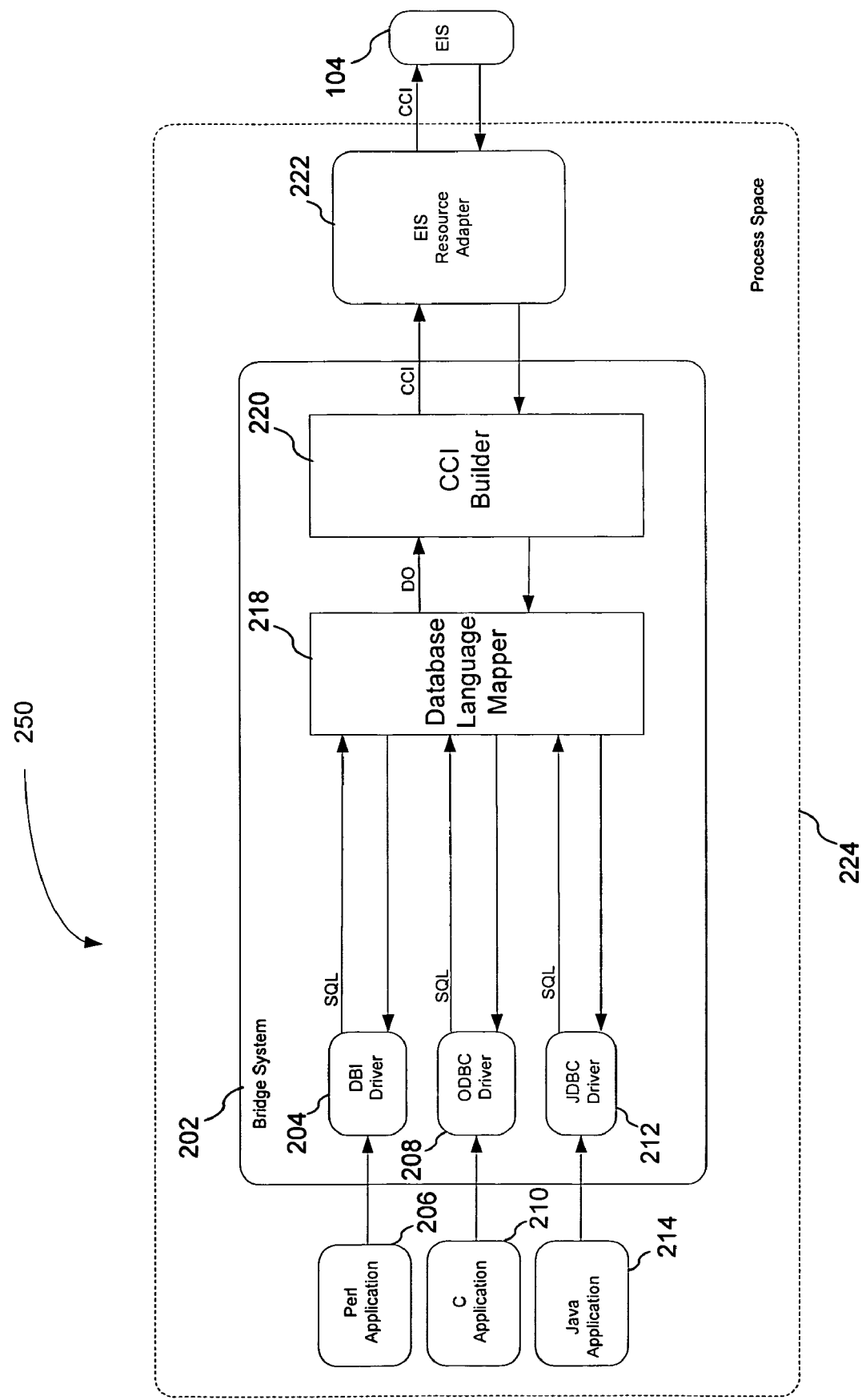
FIG. 2B illustrates a bridge in-process architecture that is an alternative configuration of the bridge network architecture illustrated in FIG. 2A.

FIG. 2B illustrates a bridge in-process architecture 250 that is an alternative configuration of the bridge network architecture 200 illustrated in FIG. 2A. The network server 216 is not utilized in the in-process architecture 250. Accordingly, the database drivers interact directly with the Database Language Mapper 218. Further, the clients, database drivers, the Database Language Mapper 218, the CCI Builder 220, and the EIS Resource Adapter 222 run inside the process space 224.

Figure 3:
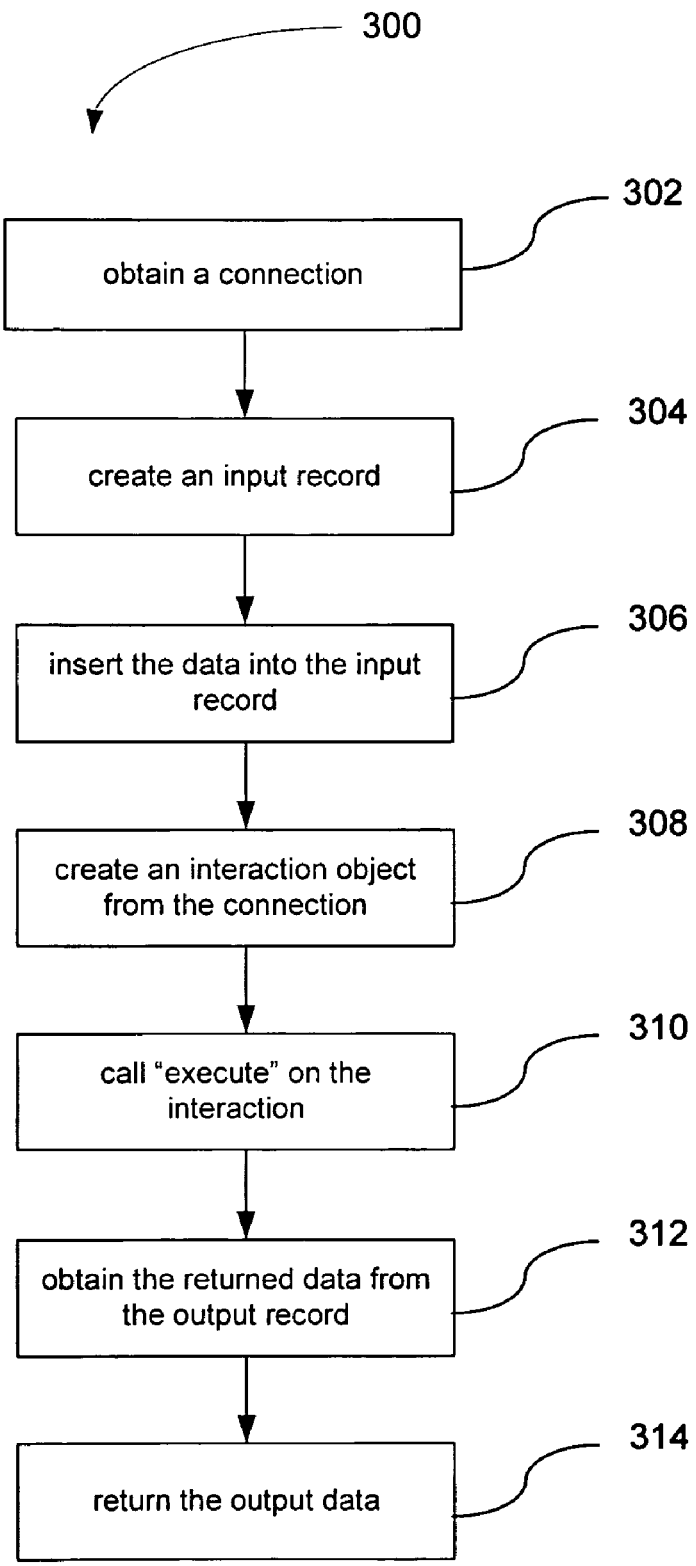
FIG. 3 illustrates a process that is utilized by the Common Client Interface ("CCI") Builder 220 to build a CCI client.

FIG. 3 illustrates a process 300 that is utilized by the CCI Builder 220 to build a CCI client. At a process block 302, the process 300 obtains a connection from the resource adapter's connection factory. Further, at a process block 304, the process 300 creates an input record. In addition, at a process block 306, the process 300 inserts the data into the input record. At a process block 308, the process 300 creates an interaction object from the connection. Further, at a process block 310, the process 300 calls "execute" on the interaction. In addition, at a process block 312, the process 300 obtains the returned data from the output record. Finally, at a process block 314, the process 300 returns the output data from the output record to the Database Language Mapper 218.

Figure 4:
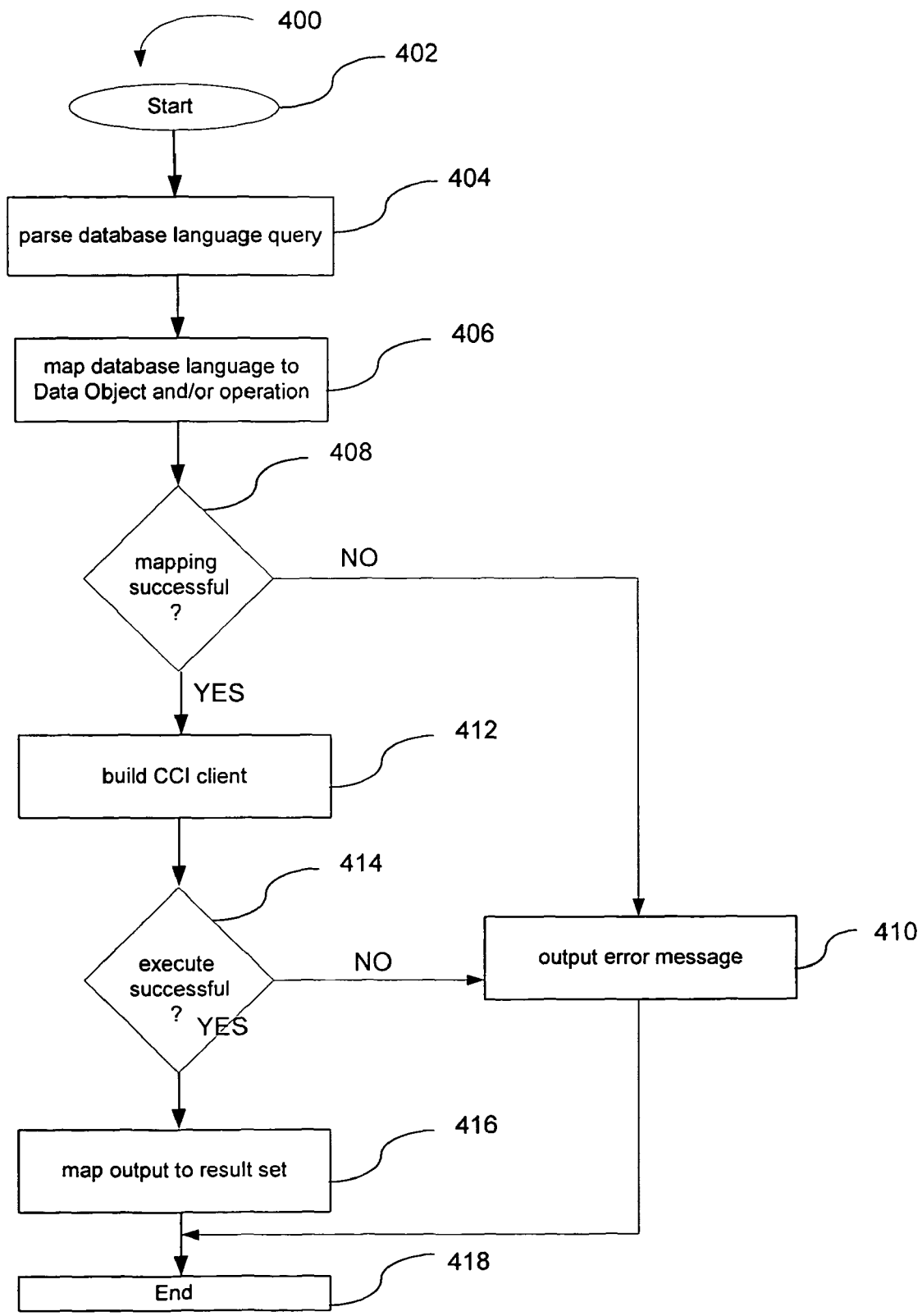
FIG. 4 illustrates a process that may be utilized by the bridge component 202.

FIG. 4 illustrates a process 400 that may be utilized by the bridge component 202. At a process block 402, the process 400 starts. Further, at a process block 404, the process 400 parses the database language query, e.g., SQL. In one embodiment, the Database Language Mapper 218 performs this parsing. In addition, at a process block 406, the process 400 maps the database language to a DO and/or an operation. In embodiment, the Database Language Mapper 218 performs this mapping. At a decision block 408, the process 400 determines if the mapping was successful. If the mapping was not successful, the process 400 proceeds to a process block 410 to output an error message. The process 400 then proceeds to the end at a process block 416. However, if the mapping is determined to be successful at the decision block 408, the process 400 instead proceeds to a process block 412 to build a CCI client as described with respect to FIG. 3. In one embodiment, the CCI Builder 220 receives the output from the Database Language Mapper 218 and utilizes that data to build the CCI client. The process 400 then proceeds to a decision block 414 to determine if the execute function call made during the building of the CCI client was successful. If the execute function was not successful, the process 400 proceeds to the process block 410 to output an error message. The process 400 then proceeds to the end at the process block 418. However, if the execute function is determined to be successful at the decision block 414, the process 400 instead proceeds to a process block 416 to map the output to a result set. The process 400 then proceeds to the end at the process block 418.

FIGS. 5A-5G illustrate a variety of single-level operations performed on a DO 508. FIG. 5A illustrates a table 500 with the insert operation for the DO 508. A field 502 indicates that the field is the operation field and a field 504 indicates that the operation is the create operation. Further, a field 506 indicates that the field is the data field and a field 508 indicates the DO 508. As an example, the DO 508 may have fields such as FirstName, LastName, and CusotmerID.

The insert operation maps to a create object operation with all the values populated into the DO 508 as specified in the statement. If no column names are explicitly specified, the values are put into the DO 508 in the order they appear in the statement and in the DO 508. As an example, the statement 'INSERT INTO CUSTOMER(FirstName, LastName) VALUES('Travis', 'Nelson')' utilizes the insert operation to insert the value 'Travis' into the FirstName field and 'Nelson' into the LastName field of the DO 508. As a result, the DO 508 has the value 'Travis' for the FirstName field and the value Nelson for the SecondName field.

FIG. 5B illustrates a table 510 with the delete operation for the DO 508. A field 512 indicates that the operation is the delete operation. The delete operation maps to a delete operation with the primary or composite key of the DO 508 specified as the data. The literal or parameterized values of the WHERE clause are populated as data in the columns indicated in the WHERE clause. As an example, the statement 'DELETE FROM CUSTOMER WHERE CUSTOMERID='0001'' utilizes the delete operation to delete the values from the DO 508. As a result, the only remaining value in the DO 508 is '0001' for the CustomerID field.

FIG. 5C illustrates a table 520 with the retrieve operation for the DO 508 as input to the adapter. A field 522 indicates that the operation is the retrieve operation. The literal or parameterized values of the WHERE clause are populated as data in the columns indicated in the WHERE clause. Where no columns are specified in the SELECT clause, all of the columns in the will be populated in the return DO 508. Where certain columns are projected, those columns will be populated. As an example, the statement 'SELECT*FROM CUSTOMER WHERE CUSTOMERID='0001'' utilizes the retrieve operation to retrieve the DO 508 having a CustomerID with a value '0001'.

Further, FIG. 5D illustrates a table 530 with the retrieve operation illustrated in FIG. 5C for the DO 508 as output to the adapter. For example, with respect to the CustomerID field having a value of '0001', the DO 508 may have the value 'Travis' for the FirstName field and the value 'Nelson' for the LastName field. The output from the adapter will then be mapped to a result set with each of the populated properties becoming a column in the result set. Each DO 508 returned becomes a row. Where the input data does not contain a primary key, the operation will map to RetrieveAll. The output can then contain multiple objects such that each object will map to a row in the result set returned.

FIG. 5E illustrates another table 540 with the retrieve operation for the DO 508 as input to the adapter. As an example, the statement 'SELECT FIRSTNAME FROM CUSTOMER WHERE CUSTOMERID='0001'' utilizes the retrieve operation to retrieve the DO 508 having a CustomerID with a value '0001' such that only the value of the FirstName field is displayed.

Further, FIG. 5F illustrates a table 550 with the retrieve operation illustrated in FIG. 5E for the DO 508 as output to the adapter. For example, with respect to the CustomerID field having a value of '0001', the DO 508 may have the value 'Travis' for the FirstName field. Irrespective of whether the DO 508 has a value for the LastName field, e.g., 'Nelson,' only value for the FirstName is displayed. Accordingly, the result set returned will only include columns that were in the original projection. For instance, if FirstName field is projected, only the FirstName column will be in the result set.

FIG. 5G illustrates a table 560 with the update operation for the DO 508. A field 562 indicates that the operation is the update operation. An UPDATE SQL statement maps to the Update operation. Values specified in the SET clause will be set in the input object as will any key values present in the WHERE clause. If the column name is present in both clauses, and the value is different in those two places, this cannot be represented as a single operation on the adapter. As an example, the statement 'UPDATE CUSTOMER SET FIRSTNAME='TRAVIS' WHERE CUSTOMERID='0001'' maps to the DO 508 such that the DO 508 having the value of 'Travis' for the CustomerID field is updated to have a value of 'Travis' for the FirstName field.

FIG. 6 illustrates a process 600 that is utilized to provide access to an adapter. At a process block 602, the process 600 receives a request from a database driver that is compatible with a software application. The request is in a database language format. Further, at a process block 604, the process 600 parses the request. In addition, at a process block 606, the process 600 coverts the request into an intermediary data format. Finally, at a process block 608, the process 600 provides the request in the intermediary data format to a common client interface builder that reformats the request into a format that is compatible with a system resource adapter and invokes the system resource adapter with the reformatted request.

FIG. 7 illustrates a block diagram of a system 700 that provides access to an adapter. In one embodiment, the system 700 is suitable for storing and/or executing program code and is implemented using a general purpose computer or any other hardware equivalents. Thus, the system 700 comprises a processor 702, a memory 708, e.g., random access memory ("RAM") and/or read only memory ("ROM"), an adapter access module 706, and various input/output devices 704.

The processor 702 is coupled, either directly or indirectly, to the memory 708 through a system bus. The memory 708 can include local memory employed during actual execution of the program code, bulk storage, and/or cache memories which provide temporary storage of at least some program code in order to reduce the number of times code must be retrieved from bulk storage during execution.

The input/output devices 704 can be coupled directly to the system 700 or through intervening input/output controllers.

Further, the input/output devices 704 can include a keyboard, a keypad, a mouse, a microphone for capturing speech commands, a pointing device, and other user input devices that will be recognized by one of ordinary skill in the art. Further, the input/output devices 704 can include a receiver, transmitter, speaker, display, image capture sensor, biometric sensor, etc. In addition, the input/output devices 704 can include storage devices such as a tape drive, floppy drive, hard disk drive, compact disk ("CD") drive, etc.

Network adapters may also be coupled to the system 700 to enable the system 700 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

*IBM, WebSphere, WebSphere Business Monitor, WebSphere Integration Developer and WebSphere Process Server are registered trademarks of International Business Machines Corporation in the United States, other countries, or both.

We claim:

1. A computer program product comprising a storage device storing a computer readable program, wherein the computer readable program when executed on a computer causes the computer to:

receive a database language request from a database driver that is compatible with a software application, wherein the database language request is in a database language format, and wherein the database driver processes standard database calls;

parse the database language request;

convert the database language request into an intermediary data format, wherein the intermediary data format comprises a data object identifying an operation and data, wherein the data includes at least one field with an associated value; and provide the database language request in the intermediary data format to a common client interface builder that reformats the database language request into a format that is compatible with a system resource adapter, invokes the system resource adapter with the reformatted request, receives the data object that has been modified from the system resource adapter, and maps the received data object to a result set.

2. The computer program product of claim 1, wherein the database language request is intended for an Enterprise Information System.

3. The computer program product of claim 1, wherein the database language format is Standard Query Language.

4. The computer program product of claim 1, wherein the database driver and the common client interface builder run inside a process space.

5. The computer program product of claim 1, wherein the format that is compatible with the system resource adapter is incompatible with the software application.

6. The computer program product of claim 1, wherein the database language request from the database driver is received directly in a local server mode.

7. A method comprising:

receiving a database language request from a database driver that is compatible with a software application, wherein the database language request is in a database language format, and wherein the database driver processes standard database calls;

parsing the database language request;

converting the database language request into an intermediary data format, wherein the intermediary data format comprises a data object identifying an operation and data, wherein the data includes at least one field with an associated value; and providing the database language request in the intermediary data format to a common client interface builder that reformats the database language request into a format that is compatible with a system resource adapter, invokes the system resource adapter with the reformatted request, receives the data object that has been modified from the system resource adapter, and maps the received data object to a result set.

8. The method of claim 7, wherein the database language request is intended for an Enterprise Information System.

9. The method of claim 7, wherein the database language format is Standard Query Language.

10. The method of claim 7, wherein the database driver and the common client interface builder run inside a process space.

11. The method of claim 7, wherein the format that is compatible with the system resource adapter is incompatible with the software application.

12. The method of claim 7, wherein the database language request from the database driver is received directly in a local server mode.

13. A bridge component comprising:

a hardware processor;

a database driver that is compatible with a software application, the database driver receiving a database language request from the software application intended for a system, wherein the database language request is in a database language format, and wherein the database driver processes standard database calls;

a database language mapper that receives the database language request from the database driver, parses the database language request, and converts the database language request into an intermediary data format, wherein the intermediary data format comprises a data object identifying an operation and data, wherein the data includes at least one field with an associated value; and a common client interface builder that receives the database language request in the intermediary data format from the database language mapper, reformats the database language request into a format that is compatible with a system resource adapter, invokes the system resource adapter, by utilizing the hardware processor, with the reformatted request, receives the data object that has been modified from the system resource adapter, and maps the received data object to a result set.

14. The bridge component of claim 13, wherein the system is an Enterprise Information System.

15. The bridge component of claim 13, wherein the database language format is Standard Query Language.

16. The bridge component of claim 13, wherein the database driver, the database language mapper, and the common client interface builder run inside a process space.

17. The bridge component of claim 13, wherein the format that is compatible with the system resource adapter is incompatible with the software application.

18. The bridge component of claim 13, wherein the database driver and the database language mapper communicate directly in a local server mode.

19. A computer program product comprising a storage device storing a computer readable program, wherein the computer readable program when executed on a computer causes the computer to:

receive a request from a database driver through a network server, wherein the database driver is compatible with a software application that is enabled to communicate with a database system and is not enabled to communicate with a system resource adapter to access the database system, wherein the request is in a database language format, and wherein the database driver processes standard database calls;

parse the request;

convert the request into an intermediary data format, wherein the intermediary data format comprises a data object identifying an operation and data, wherein the data includes at least one field with an associated value; and provide the request in the intermediary data format to a common client interface builder that reformats the request into a format that is compatible with the system resource adapter, invokes the system resource adapter with the reformatted request to communicate with the database system, receives the data object that has been modified by the system resource adapter, and maps the received data object to a result set.

20. The computer program product of claim 19, wherein the request is intended for an Enterprise Information System.

21. The computer program product of claim 19, wherein the database language format is Standard Query Language.

22. The computer program product of claim 19, wherein the format that is compatible with the system resource adapter is incompatible with the software application.

23. A method comprising:

receiving a request from a database driver through a network server, wherein the database driver is compatible with a software application that is enabled to communicate with a database system and is not enabled to communicate with a system resource adapter to access the database system, wherein the request is in a database language format, and wherein the database driver processes standard database calls;

parsing the request;

converting the request into an intermediary data format, wherein the intermediary data format comprises a data object identifying an operation and data, wherein the data includes at least one field with an associated value; and providing the request in the intermediary data format to a common client interface builder that reformats the request into a format that is compatible with the system resource adapter, invokes the system resource adapter with the reformatted request to communicate with the database system, receives the data object that has been modified by the system resource adapter, and maps the received data object to a result set.

24. The method of claim 23, wherein the request is intended for an Enterprise Information System.

25. The method of claim 23, wherein the database language format is Standard Query Language.

* * * * *